United States Patent Office 3,211,528
Patented Oct. 12, 1965

3,211,528
MANUFACTURE OF TITANIUM DIOXIDE
Raymond James Wigginton, Grimsby, England, assignor to Laporte Titanium Limited, London, England, a British company
No Drawing. Filed Mar. 13, 1961, Ser. No. 95,018
Claims priority, application Great Britain, Mar. 17, 1960, 9,564/60
10 Claims. (Cl. 23—202)

This invention relates to the manufacture of titanium dioxide in a form that is especially suitable for incorporation as an opacifier in vitreous enamels and glazes. Apart from freedom from impurities imparting discoloration and poor reflectance to the enamel in which the titanium dioxide is incorporated, titanium dioxide suitable for the above purpose should have free flowing properties in the dry state, be capable of mixing easily in the dry state with the ingredients of the enamel frit, dissolve well in the frit during smelting, and the relatively non-dusting with consequent advantages to both manufacturer and user.

The present invention provides a process for the manufacture of titanium dioxide suitable for incorporation in vitreous enamels and glazes, wherein a hydrous titanium dioxide precipitate is prepared by adding an aqueous solution of titanium sulphate having a concentration of titanium within the range of 120 to 180 grams per litre calculated as $TiO_2$, and having a temperature within the range of 40° C. to 70° C., to a proportion of hot water such that after complete mixing the concentration of dissolved and undissolved titanium is within the range of 75 to 95 grams per liter calculated as $TiO_2$, the temperature of the mixture being maintained above 70° C. during mixing and for a period thereafter sufficient to complete the hydrolysis, a minor proportion of the precipitate so formed is separated and, while substantially free from sulphate ion, peptized by treating it with hydrochloric acid to form a suspension having a pH value of about 2, the peptized hydrous titanium dioxide is mixed with the remainder of the hydrous titanium dioxide precipitate, and the mixture, while free from loosely bound sulphuric acid, is subjected to calcination.

The calcination conditions may be those customarily used for calcining hydrous titanium dioxide precipitates, and the calcination temperature is advantageously within the range of 700° C. to 1150° C., and preferably 700° C. to 950° C., and it will be understood that the calcination conditions should be such as to yield a product containing at least 97% of $TiO_2$, and preferably at least 98.5% of $TiO_2$.

The titanium sulphate solution, from which the hydrous titanium dioxide is prepared, is advantageously one obtained by the sulphation of ilmenite or a mixture of ilmenites and/or a titanium-enriched material prepared from ilmenite or a mixture of such materials. Such a sulphation liquor advantageously has a factor of acidity within the range of 50 to 80%, and preferably 60 to 70% and has a ratio of $TiO_2$ to iron of 1.2:1 to 3:1, and preferably 1.8:1 to 2.2:1.

It is known that hydrous titanium dioxide cannot be peptized unless it is substantially free from sulphate ion, that is to say, substantially free from sulphates and sulphuric acid. Accordingly, for this purpose the minor proportion of the hydrous titanium dioxide precipitate, before or after it is separated, and before it is peptized may be washed to remove loosely bound sulphuric acid, then treated with a alkali, for example, ammonia or sodium carbonate, to neutralize the residual acid, and washed to remove the salt formed by the neutralization.

In order that the mixture of the peptized hydrous titanium dioxide with the remainder of the hydrous titanium dioxide precipitate shall be free from loosely bound sulphuric acid before the calcination, the portion of the precipitate which is not peptized may be washed to remove loosely bound sulphuric acid therefrom, before or after separating the minor proportion. If desired, the portion of the precipitate which is not peptized may also be rendered substantially free from sulphate ion by neutralization and washing to remove the resulting salt, as described above with reference to the minor proportion of the precipitate.

For example, the loosely bound sulphuric acid may be removed from the whole of the precipitate, before the minor proportion thereof is separated. After being separated, the minor proportion will then require to be neutralized and washed to remove residual acid, before that portion of the precipitate is peptized. Alternatively, the minor proportion of the precipitate may be separated, without first washing the whole precipitate, and then washed, neutralized and washed again, before being peptized. In this case it is of advantage to wash the remainder of the precipitate after it has been mixed with the peptized material, because then the chloride ion from the peptized material can also be reduced or eliminated. It will, of course, be understood that, if desired, the whole of the precipitate may be washed, neutralized and washed again.

The minor proportion of the precipitate that is separated for peptization is advantageously within the range of 5% to 40% of the whole of the precipitate, and is preferably about 20%.

The separated minor proportion of the precipitate may be peptized with hydrochloric acid in known manner. If the separated pulp is inconveniently thick, it is of advantage first to slurry it with water to a concentration within the range of 200 to 700 grams of $TiO_2$ per liter, and then to add concentrated hydrochloric acid until the pH value is about 2.

The temperature of the titanium sulphate solution when it is added to the hot water, is advantageously within the range of 60° C. to 65° C. The rate at which the solution is added is advantageously such that the addition is complete within a period of 5 to 40 minutes, and preferably 15 to 25 minutes.

The concentration of the titanium sulphate solution is preferably within the range of 140 to 160 grams per liter calculated as $TiO_2$, and, after mixing the solution with the hot water, the concentration of dissolved and undissolved titanium in the mixture is preferably 80 to 85 grams per liter calculated as $TiO_2$. The temperature of the mixture during and after the mixing is preferably from 90° C. up to the boiling point of the mixture.

If desired, there may be incorporated with the hydrous titanium dioxide precipitate, after the addition of the peptized material, one or more oxides, for example, of tungsten, tantalum, molybdenum, or antimony, that are known to modify the reflectance of vitreous enamels containing titanium dioxide.

The proces of the invention yields substantially non-dusting titanium dioxide, and has numerous other advantages. Thus, for instance, although the final precipitate is composed of hydrous titanium dioxide of two kinds, only one precpitation step is required, and the whole of the pulp passes in a single stream up to the calcination step.

The following examples illustrate the invention:

*Example 1*

1200 gallons of a titanium sulphate solution obtained by the sulphation if ilmenite and containing per liter, 151.7 grams of $TiO_2$, 3.0 grams of $TiO_2$ (as titanous), 75.8 grams of Fe, 5.0 grams of $MnSO_4$ and 442.5 grams of $H_2SO_4$ (the liquor thus having a factor of acidity of 65%) were heated to 65° C., and then run at a uniform rate in the course of 21 minutes into 1,080 gallons of water having a temperature of 90° C. Throughout the addition the mixture was stirred at 90° C. The final concentration of dissolved and undissolved titanium in the mixture was 80 grams per liter calculated as $TiO_2$. When the addition was complete, the whole was raised to the boil and maintained at the boil for 2 hours. The yield of hydrous precipitate was 95.5%. The precipitate was in a highly flocculated condition such that when 250 mls. of hydrolysate were allowed to settle in a graduated cylinder for 1 hour a settled volume of 28 mls. was obtained for the hydrous titanium oxide precipitate.

The precipitate was washed in known manner on a filter with slightly acidified water (N/50 sulphuric acid), and it was then substantially free from iron and manganese sulphates, but contained a small proportion of absorbed sulphuric acid. A proportion constituting 20% of the whole was separated and neutralized to a pH value of 6.8 with ammonia solution. It was filtered off and washed free from sulphates with distilled water, and then slurried with distilled water to a concentration of approximately 400 grams per liter $TiO_2$. By the addition of concentrated hydrochloric acid to produce a pH value of 2.0 a suspension of peptised hydrous titanium dioxide was obtained, which was then thoroughly mixed with the remainder of the washed precipitate. After being dewatered, the precipitate was calcined at 860° C. for 1½ hours, whereby a free-flowing titanium dioxide containing 98.5% of $TiO_2$ and suitable for incorporation in vitreous enamels, was obtained.

The titanium dioxide thus obtained had a dust content of 9.4%. This corresponds very favorably with the dust content of 75% of the titanium dioxide obtained by calcining the precipitate without adding the peptized materal.

*Example 2*

In this example the procedure was the same as that described in Example 1, except that the minor portion of the precipitate was separated, washed, neutralized and washed again, without first washing the whole precipitate, and the precipitate was washed after the addition of the peptized material. Washing at this stage has the advantage that it will also reduce or eliminate the chloride ion content of the peptized portion. The presence of chloride ion is undesirable, particularly from the corrosion point of view when conducting the subsequent calcination of the precipitate.

The above referred to "dust contents" were determined by blowing a gas at a fixed rate for a given time through a known weight of the product in the fluidized state in a vertical tube in the following manner: The glass tube had a length of 21 inches and an internal diameter of 1 inch, and a disc of sintered glass having a pore size of 200–250 microns and a thickness of 5 mm. was held in position at the lower end of the tube by a rubber sleeve. The product to be tested was sieved through a sieve of 60 mesh B.S.S. and, when necessary dried at about 110° C. for 1 hour. 20 grams of the sieved material were placed in the glass tube on the sintered glass disc. Oxygen from a cylinder was passed through a needle valve and a rotameter and through the glass disc into the material to be tested. The rate of flow of the oxygen was adjusted to 5.0 liters of oxygen per minute (measured at 20° C. and 760 mm.). The said rate of flow of oxygen was maintained for 5 minutes. The loss in weight of the material due to the dust carried away by the oxygen was determined by weighing the material left in the tube. If, during the test, the material showed signs of channeling to allow the gas to pass through without properly fluidizing the material, the glass tube was lightly tapped.

I claim:

1. A process for the manufacture of titanium dioxide suitable for incorporation in vitreous enamels and glazes, which comprises the steps of (a) preparing a hydrous titanium dioxide precipitate by adding an aqueous solution of titanium sulphate having a concentration of titanium within the range of 120 to 180 grams per liter calculated as $TiO_2$, and having a temperature within the range of 40° C. to 70° C., to a proportion of hot water such that after complete mixing the concentration of dissolved and undissolved titanium is within the range of 75 to 95 grams per liter calculated as $TiO_2$, the temperature of the mixture being maintained above 70° C. during mixing and for a period thereafter sufficient to complete the hydrolysis; (b) separating a minor proportion of the precipitate so formed; (c) peptizing the said minor proportion of the precipitate, while substantially free from sulphate ion, by treating it with hydrochloric acid to form a suspension having a pH value of about 2; (d) mixing the peptized hydrous titanium dioxide with the remainder of the hydrous titanium dioxide precipitate; (e) washing (i) said remainder at least after preparation of said precipitate to remove loosely bound suphuric acid and (ii) said minor proportion at least after peptizing to reduce materially the content of chloride ion resulting from treatment of said minor proportion with said hydrochloric acid; and (f) subjecting the mixture to calcination, while free from loosely bound sulphuric acid and materially reduced in its content of said chloride ion.

2. A process as claimed in claim 1, wherein after the hydrolysis, the minor proportion of the precipitate is separated without first washing the precipitate, the separated minor portion is washed, then neutralized and washed again to render it substantially free from sulphate ion, and the mixture of the peptized hydrous titanium dioxide and the remainder of the precipitate is washed to remove loosely bound sulphuric acid and chloride ion.

3. A process as claimed in claim 1 wherein the minor proportion of the precipitate that is separated for peptization is within the range of 5 to 40 percent of the whole precipitate.

4. The process defined in claim 1 wherein the separated minor proportion of the precipitate, while substantially free from sulphate ion, is slurried with water to a concentration within the range of 200 to 700 grams of $TiO_2$ per liter, and is then peptized by adding concentrated hydrochloric acid to the slurry until the latter has a pH value of about 2.

5. The process defined in claim 1 wherein the temperature of the aqueous solution of titanium sulphate, when it is added to the hot water, is within the range of 60° C. to 65° C.

6. The process defined in claim 1 wherein the aqueous solution of titanium sulphate is added to the hot water within a period of 5 to 40 minutes.

7. The process defined in claim 1 wherein the aqueous solution of titanium sulphate has a concentration within the range of 140 to 160 grams per liter calculated as $TiO_2$.

8. The process defined in claim 1 wherein, after mixing the titanium sulphate solution with the hot water, the concentration of dissolved and undissolved titanium in the mixture is within the range of 80 to 85 grams per liter calculated as $TiO_2$.

9. The process defined in claim 1 wherein the temperature of the mixture is maintained from 90° C. up to the boiling point of the mixture during the mixing and up to completion of the hydrolysis.

10. The process defined in claim 2, wherein the said mixture of the peptized hydrous titanium dioxide and the remainder of the precipitate, after being washed to remove loosely bound sulphuric acid and to materially reduce the content of the chloride ion, is neutralized and washed again to render it substantially free from sulphate ion, (References on following page)

References Cited by the Examiner

UNITED STATES PATENTS

| | | | |
|---|---|---|---|
| 1,504,673 | 8/24 | Blumenfeld | 23—202 |
| 2,448,683 | 9/48 | Peterson | 106—299 |
| 2,721,787 | 10/55 | Hettrick | 23—202 |
| 2,842,428 | 7/58 | Tanner et al. | 23—202 |
| 2,998,321 | 8/61 | Evans | 106—299 |
| 3,000,704 | 9/61 | Stanley et al. | 23—202 |

OTHER REFERENCES

Mansell: "Titanium Pigments," Paint, Oil & Chem. Rev., February 6, 1947, page 18.

Britton: Hydrogen Ions, publ. 1929 by Van Nostrand Co. of New York City, page 48.

TOBIAS E. LEVOW, *Primary Examiner.*

JOHN R. SPECK, *Examiner.*